United States Patent [19]

Hyde

[11] Patent Number: 5,635,280

[45] Date of Patent: Jun. 3, 1997

[54] POSTFORMING METHOD AND APPARATUS

[76] Inventor: Richard J. Hyde, 37 Langdale Gardens, Hove BN3 4HL, England

[21] Appl. No.: 211,148

[22] PCT Filed: Sep. 24, 1992

[86] PCT No.: PCT/GB92/01758

§ 371 Date: May 24, 1994

§ 102(e) Date: May 24, 1994

[87] PCT Pub. No.: WO93/05948

PCT Pub. Date: Apr. 1, 1993

[30] Foreign Application Priority Data

Sep. 24, 1991 [GB] United Kingdom ............ 9120288

[51] Int. Cl.⁶ ............................................ B32B 9/00
[52] U.S. Cl. ................ 428/192; 428/121; 428/172; 428/218; 428/464; 428/474.4; 428/511; 156/212; 156/216; 156/475; 29/564.2
[58] Field of Search ......................... 428/511, 280, 428/284, 286, 224, 409, 287, 121, 172, 218, 192, 245, 464, 474.4; 156/212, 216, 475; 29/564.2

[56] References Cited

FOREIGN PATENT DOCUMENTS 3145661  5/1983  Germany.

*Primary Examiner*—Patrick Ryan
*Assistant Examiner*—Abraham Bahta
*Attorney, Agent, or Firm*—Chilton, Alix & Van Kirk

[57] ABSTRACT

An apparatus for forming a laminate to a core having a profiled edge, comprising a frame for supporting the core and laminate, a resilient sheet, and means mounted to the frame for placing the sheet in tension and moving the sheet between a position out of contact with the laminate to a tensioned position in contact with the laminate, whereby further movement of the sheet applies a force to the laminate to form the laminate to the edge of the core.

19 Claims, 7 Drawing Sheets

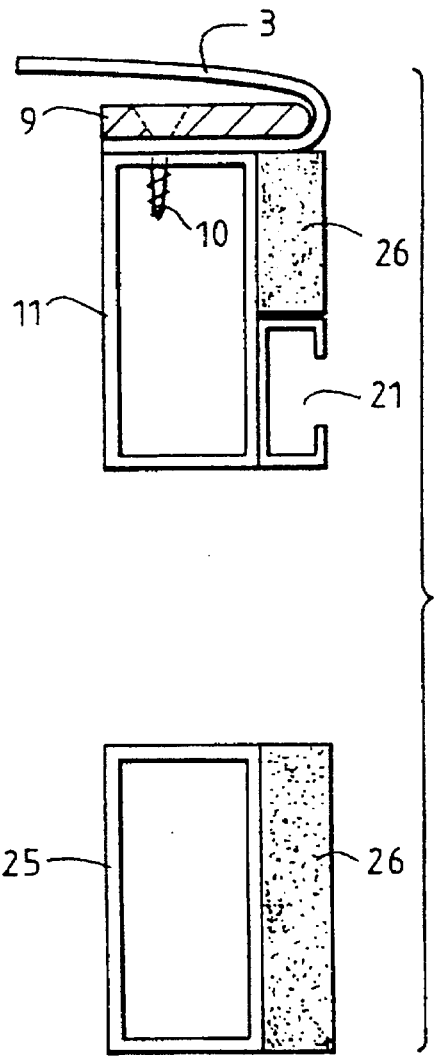
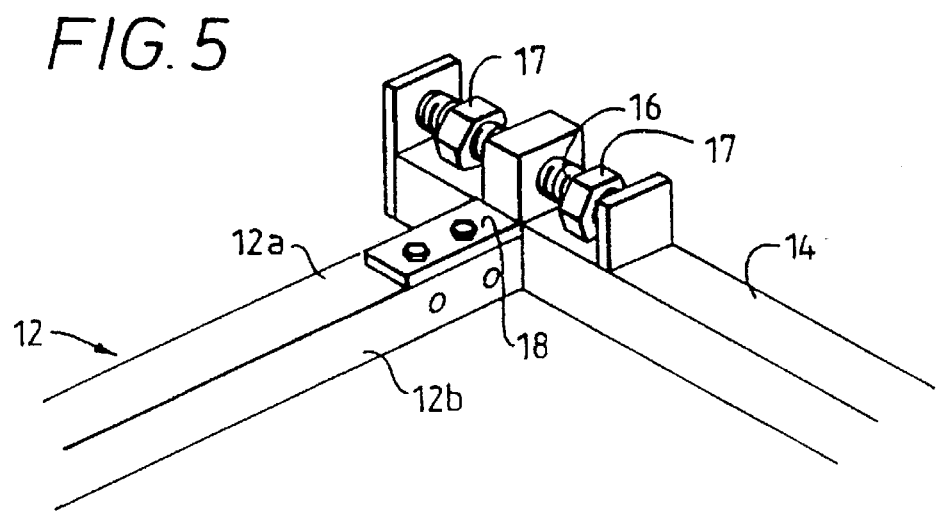

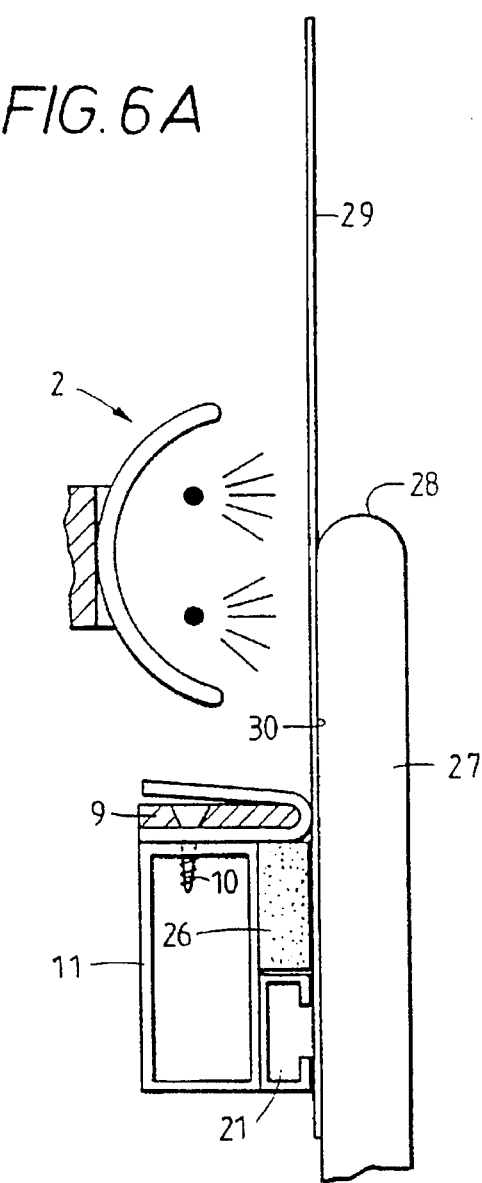
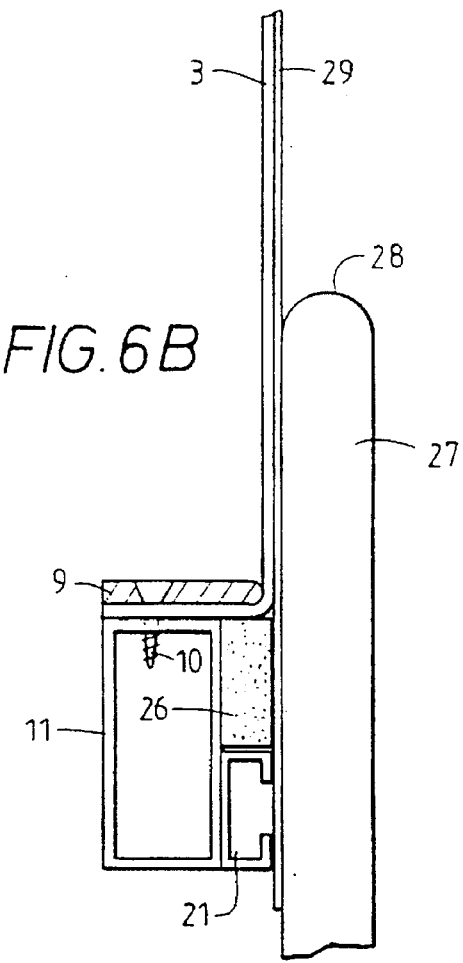
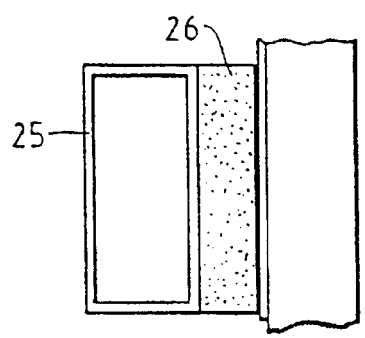
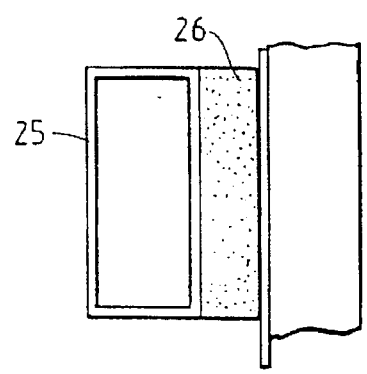

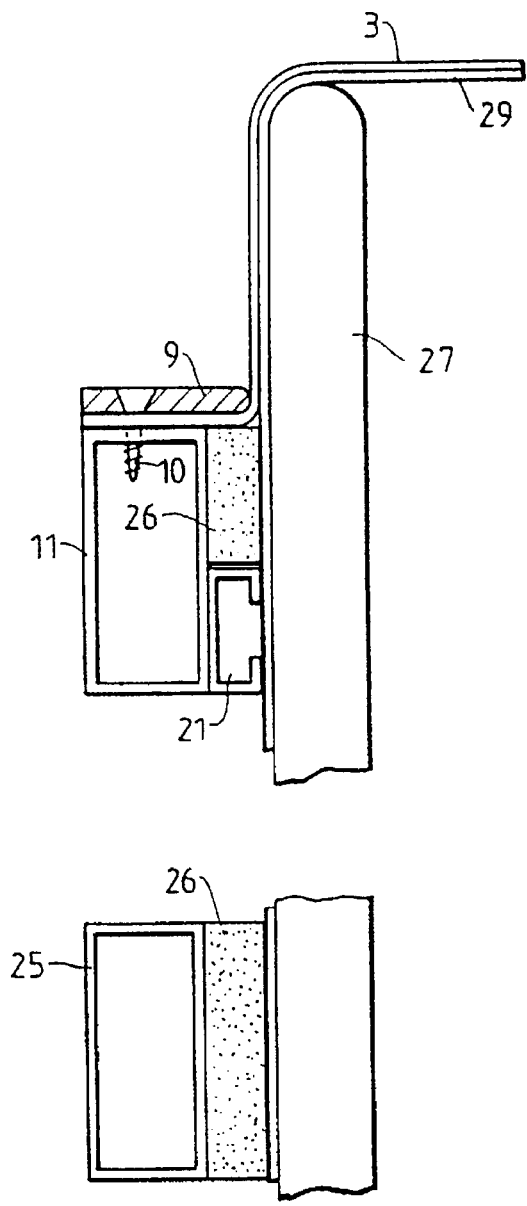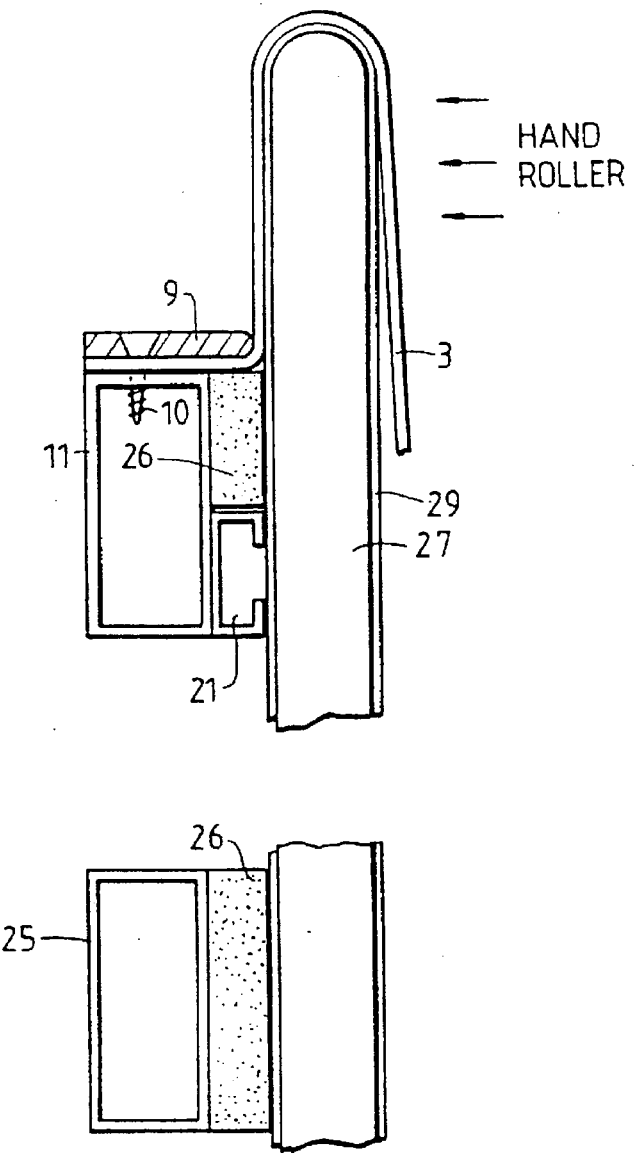

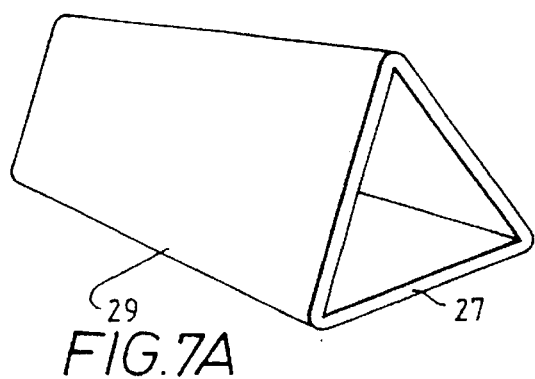
FIG.7A
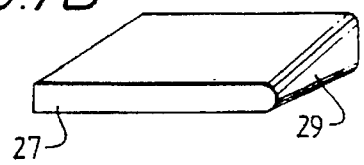
FIG.7B
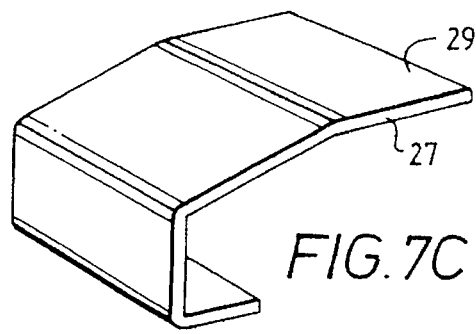
FIG.7C
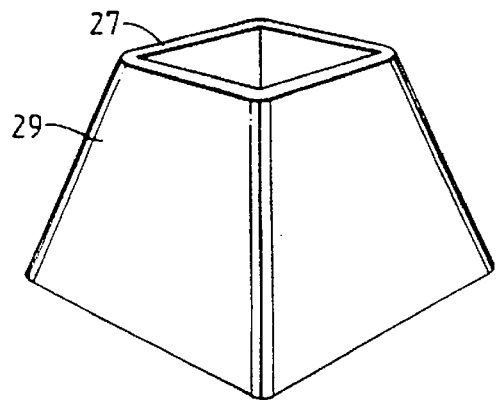
FIG.7D
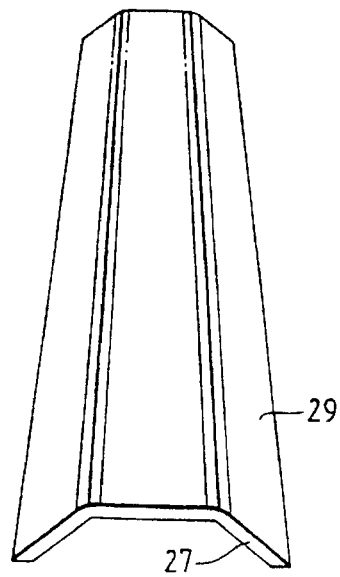
FIG.7E
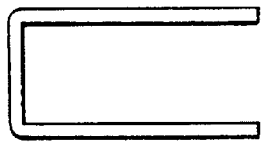
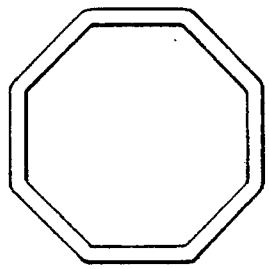
FIG.7F
FIG.7G

POSTFORMING METHOD AND APPARATUS

The present invention relates to a method and apparatus for postforming a laminate to a core of, for example, chipboard, plywood or M.D.F., etc. The term laminate should be taken to cover any sheet material which may be applied to a core, including plastics, metallic laminates, melamine and wood veneers.

To form a laminate about a core having a profiled edge, it is traditional that the laminate is firstly cut in accordance with the core shape, and an adhesive applied to the laminate and/or core surface. The laminate is then bonded to a flat surface of the core, with a portion overlapping the core edge. The core and laminate are then placed on a postforming machine which heats the overlap to allow it to bend without cracking. The machine then wraps the overlap around the core edge.

There are a number of different types of postforming machine. Most either use metal flanges having a profile corresponding to a portion of the core edge profile or use plates or rollers to press the laminate against the edge and form it to the core. There are two basic types of machine: flow-line machines in which the laminate and core move along a conveyor to a heating station and then to a forming station; and static machines in which the laminate and core are held fixed and the heating element and the bending rollers or flanges are pivotable in turn to face/contact the laminate.

Most machines are capable of forming laminate around a profiled edge through an angle of 180°, but either this action requires two separate machining operations, or else the structure of the machine itself limits the extent to which the laminate can be wrapped around the profiled edge, usually to as little as 20–100 mm past the edge.

Both types of machine (and especially the flow-line type) are quite limited as to the core shapes which they are able to laminate, because neither bending rollers nor metal flanges readily adapt to different bending angles.

A. further type of postforming machine has a horizontal heating bed, above which a core and laminate are mounted. The core is manually rotated whilst being held at a constant pressure against the heating bed with the laminate sandwiched in between. Whilst such a machine allows for a greater variety of shapes to be postformed, the profiles are restricted to arcs of constant radius, and other profiles, such as parabolic and tapered profiles, are not possible. The machine is also expensive and may be cumbersome to use when postforming large and unwieldy cores.

The present invention aims to provide an apparatus and method for postforming a core and laminate, which is simple to use, inexpensive, and extends the range of possible core shapes which may be postformed.

Viewed from one aspect, the present invention provides an apparatus for forming a laminate to a core having a profiled edge, comprising a frame for supporting the core and laminate, a resilient sheet, and means mounted to the frame for placing the sheet in tension and moving the sheet between a position out of contact with the laminate to a tensioned position in contact with the laminate, whereby further movement of the sheet applies a force to the laminate to form the laminate to the edge of the core.

By using a tensioned resilient sheet to urge the laminate to the core, a simple and reliable apparatus is provided which is relatively inexpensive.

Moreover, the tensioned sheet is able to apply a more even force over a greater extent of the edge area than could the rollers or metal flaps of the prior art machines, and so, for example, a 180° wrap may be machined in one operation and the wrap may extend further around the core past the edge than was possible on prior art machines, thereby saving on manufacturing time and cost.

The same resilient sheet is able to conform to a wide variety of edge profiles having angles from 0° to about 200°, and overcomes the problem of having to use differently profiled metal flanges for different core edge profiles.

The apparatus is able to postform a wide variety of core shapes and edge profiles, some of which could not be achieved on the prior art machines, such as panels having tapered thicknesses.

In a preferred form, the core and laminate are able to be positioned upon an open face of the apparatus with the core edge projecting from an edge of the face in a direction parallel to the face.

By mounting the core and laminate against an open face of the apparatus, the area of the core over which the laminate is able to be formed is increased, as much more of the core surface is accessible than in most prior art machines, in which the profile is held between two flat plates, and in which only a relatively small area of the core, around the edge projecting from the plates, is accessible. Moreover, there is much less restriction on the overall shape of the cores which may be postformed, since the core does not need to fit between the plates and the resilient sheet is itself able to conform to numerous different shapes.

The open face could be horizontal, but preferably is substantially vertical, or angled towards the vertical, with the projecting core edge extending upwardly, in use of the apparatus.

The means for tensioning and moving the sheet could take different forms. For example, it could include pneumatic or hydraulic actuators or springs. A preferred embodiment comprises a tensioning frame to which the sheet is attached, the resilient sheet being advantageously attached at one end to the core support frame and at the other end to the tensioning frame, the tensioning frame preferably being pivotable to move the sheet into and out of contact with the laminate and to urge the laminate around the profiled edge of the core. Means, such as telescopic spring assisters, may be fitted to the frame to facilitate this movement.

In such a system, the frame could be provided with tensioning means in the form of actuators or springs arranged to hold the sheet in tension, although in a preferred and structurally simpler arrangement the pivot axis of the tensioning frame is spaced from the anchoring position of the sheet in such a way that when the tensioning frame is pivoted from a rest position to a position in which it comes into contact with the laminate, the sheet is tensioned by an amount depending upon the distance between the pivot axis and the anchoring position.

It is preferred that the pivot axis of the frame approximately coincides with the edge of the core around which the laminate is to be formed, so that during bending of the laminate, the tension in the sheet stays approximately constant or only slightly increases.

Preferably, the anchoring position of the sheet is adjacent the edge of the apparatus from which the core edge extends. This helps to ensure that the laminate bonds properly to the projecting portion of the core surface which is adjacent the open face of the apparatus.

Further, preferably, the spacing between the anchoring position of the sheet and the pivot axis is variable in such a way that the tension imparted to the resilient sheet during the forming operation may be adjusted. This may be achieved by varying the position of the anchoring position of the sheet but, preferably, it is the pivot axis which is moveable, for example, by the tensioning frame being carried on an adjustable pivot mounting. A movable pivot axis also enables it to be positioned in accordance with different core shapes and dimensions.

The tensioning frame may comprise side arms pivotally mounted to the core support frame, and a tensioning bar between the side arms, to which the resilient sheet is connected and whose position along the side arms may be varied. This again allows the tension in the sheet to be varied.

To allow the tensioning bar to move along the side arms, the side arms could have elongate holes to which the bar could be fixed. Preferably, however, each side arm has a threaded rod, along which a pair of locknuts or screw wheels run and to which a respective end of the tensioning bar is mounted. The bar is preferably mounted on the rods by a separate bracket which can be mounted on any of the faces of the bar so that further adjustment of the sheet tension can be achieved by wrapping the sheet around the bar.

The resilient sheet may be connected to the tensioning bar by hydraulic or pneumatic cylinders, which may allow for automatic tension adjustment and may remove the need for the tensioning bar to move along the side arms. Further, such cylinders could be used to connect the tensioning bar itself to the side arms to replace the above locknut or screw wheel arrangement.

A pair of sliding support plates may be provided on the face of the apparatus to engage with the core and hold it adjacent the face of the apparatus. These plates may be provided with spikes which grip into the material (such as plywood) of the core. The spikes may be of any suitable material such as metal, plastics, ceramics, etc.

Other ways of supporting the core are, of course, equally possible, such as by using a clamping plate or a vacuum holding system. For example, the open face of the machine could have vacuum ports therein, over which the core may be placed so that it is held in position. Sealing elements, such as foam rubber strips, could be provided around the ports, and the core could abut against these elements to ensure the integrity of the vacuum.

A number of vertical channels having supporting means running therealong may be provided on the front face of the apparatus to further facilitate mounting of the core. This is especially useful when machining several cores of the same dimension, since the core edges may be automatically aligned with the tensioning frame pivot axis each time they are placed on the channel supports.

It is of course necessary to heat the laminate before it is formed around the core edge, and whilst a separate heating means could be provided, it is strongly preferred that the apparatus comprises a heater unit which may be moved into and out of a position adjacent to the core and laminate, by, for example, a pivoting action.

The position of the pivot point may be movable so that the distance between the heater and laminate may be varied, and means, such as a counterweight or spring system, may be provided to facilitate the heater's movement. Preferably, the height of the heater unit in its heating position is variable by, for example, an adjustable screw stop mounted on the core support frame.

A heat shield may be provided between the heater unit and the sheet and is preferably mounted on a support frame of the heater unit. In another embodiment, however, the resilient sheet could be heat resistant so that the laminate may be heated through the sheet before the sheet forms the laminate to the core. It is also possible that the resilient sheet itself could comprise a heating element, in which case it would be held against the laminate to heat it for a set time before being, for example, pivoted further to bend the laminate around the core edge. A further possibility is that the laminate itself could have a heating element embedded within it such as a number of metal wires through which electric power could be supplied.

Viewed from a second aspect, the invention provides a method of forming a laminate to a core, comprising the steps of bonding the laminate to a preferably flat surface of the core so that a portion of the laminate overlaps an edge of the core, heating the overlap portion adjacent the core edge to a desired temperature, and bending the overlap around the core edge using a resilient sheet which is held in tension during the bending process.

The invention may advantageously be combined with prior art, for example static, postforming machines, and viewed from a third aspect, provides a kit of parts for adapting a postforming machine to carry out the method of the present invention, comprising a resilient sheet for forming a laminate about a core, and a tensioning frame which is pivotally mounted to a machine in use and adapted to place the sheet in tension and urge it against the laminate during the forming operation.

An embodiment of the present invention will now be described, by way of example only, with reference to the accompanying drawings, in which:

FIG. 4 is a cross-sectional view along the line IV—IV of FIG. 1;

FIG. 5 shows the mounting of the tensioning bar to the side arms of the tensioning frame;

Figure 1:
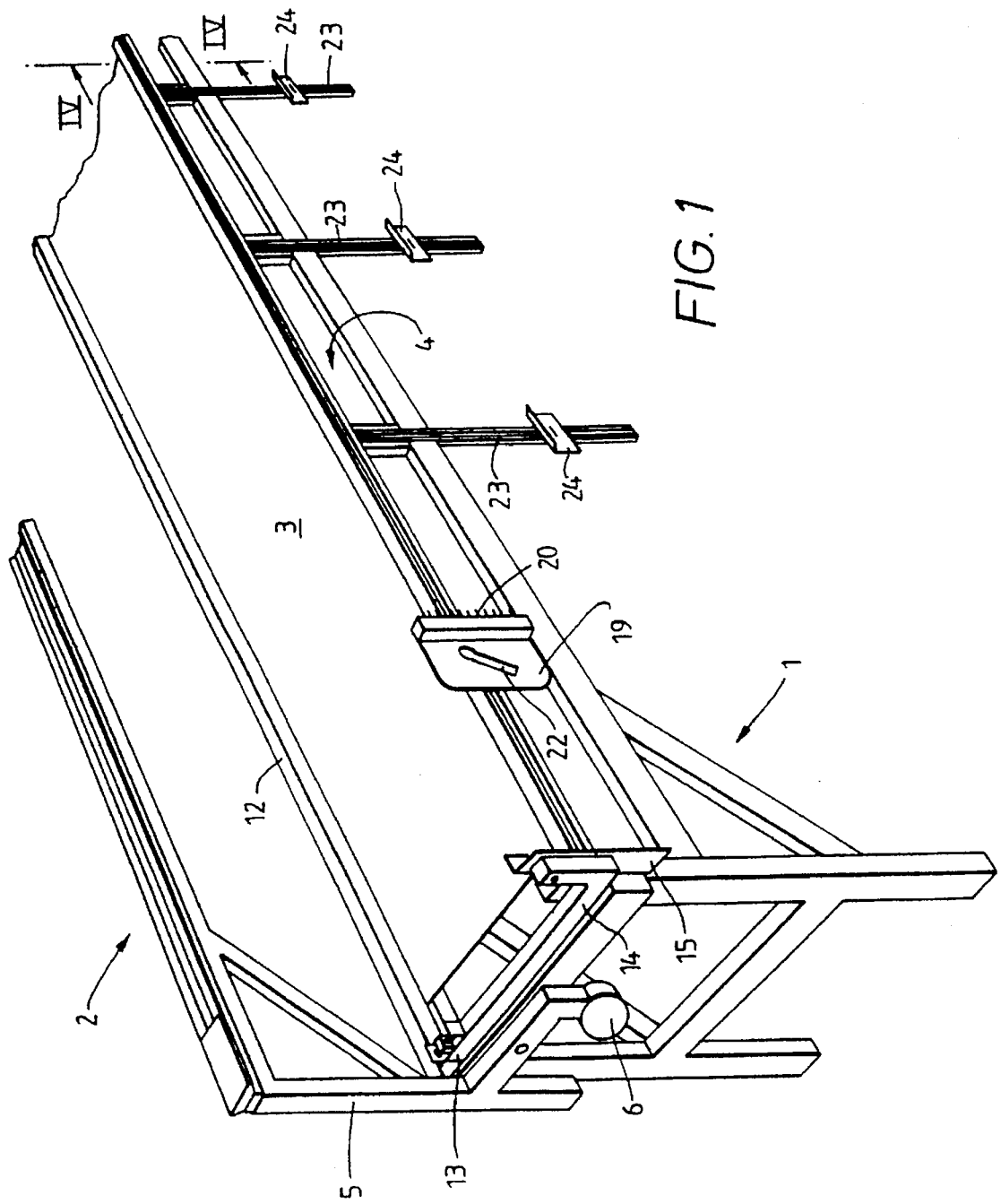
FIG. 1 is a perspective view of one end of apparatus according to the invention.
Figure 8A:
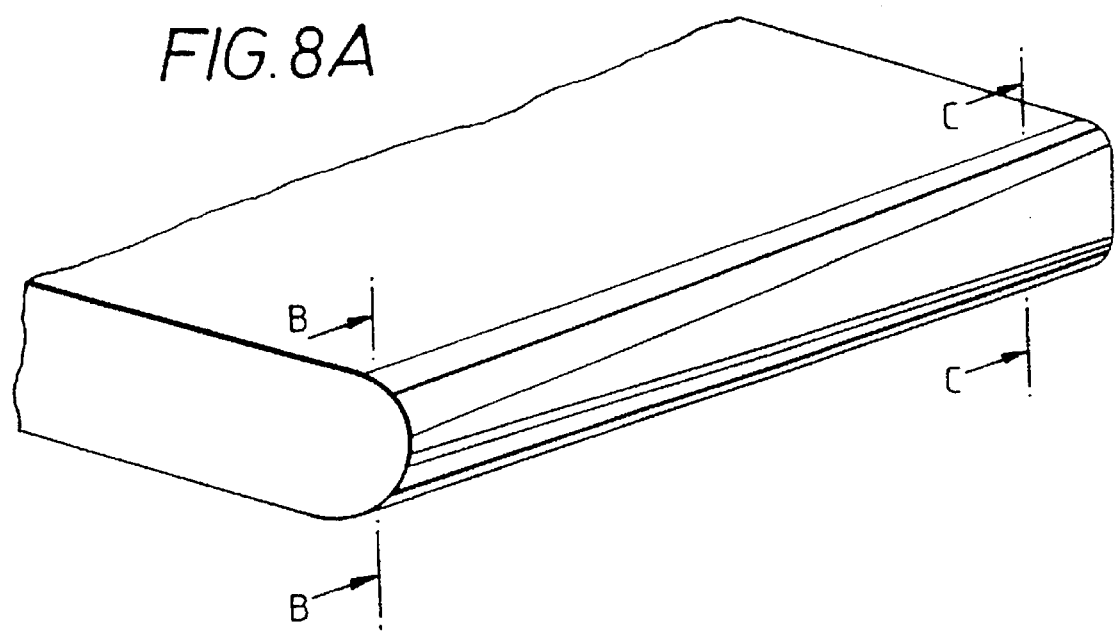
Figure 8B:
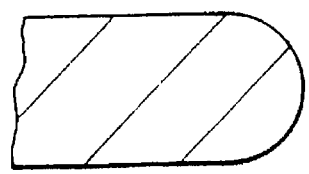
Figure 8C:
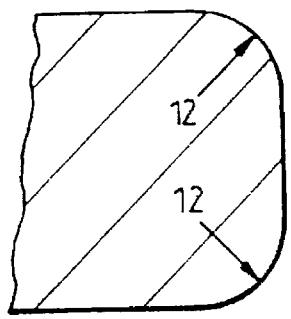

FIGS. 6A to 6D show various stages in the forming of a laminate to a core using the apparatus of FIG. 1; and FIGS. 7A–E and 8A show perspective views of sample core shapes which may be postformed in accordance with the invention, with FIG. 7F showing an end view of various postformable core shapes, FIG. 7G showing various postformable edge profiles, and FIGS. 8B and 8C showing sectional views along lines B—B and C—C of FIG. 8.

Figure 2:
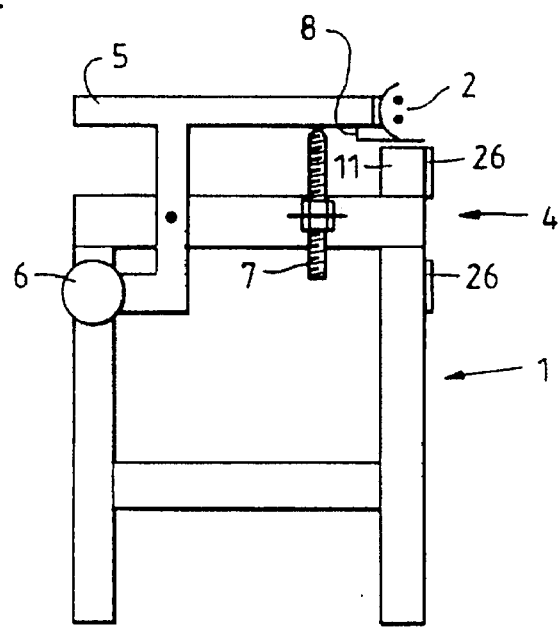
FIG. 2 is a side elevation view of the apparatus of FIG. 1 showing the heating element in its heating position, with the resilient sheet, its tensioning frame, and other features removed for clarity.
Figure 3:
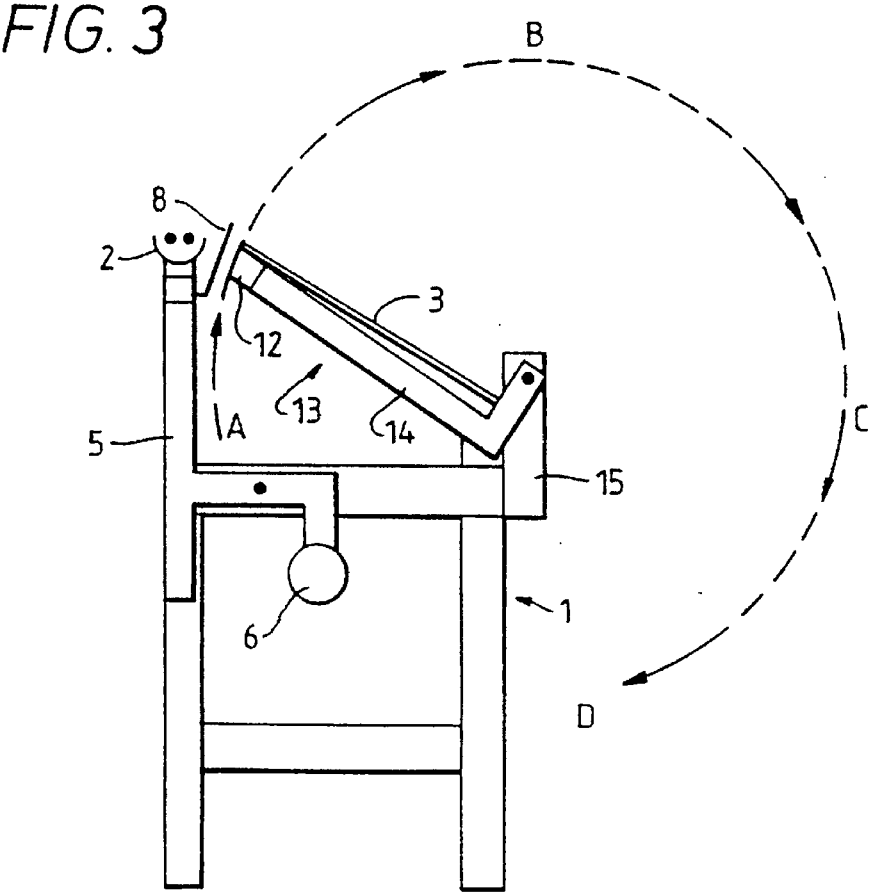
FIG. 3 is a similar view to FIG. 2, but with the heating element in its home position and showing the movement of the resilient sheet and its tensioning frame.

Referring to FIGS. 1 to 3, the postforming apparatus comprises a base frame 1, a heater unit 2, and a resilient sheet 3, such as neoprene. A core to which a laminate is to be formed is mounted in use against the open front face 4 of the apparatus.

The heater unit 2 is carried on a heater support frame 5 which is pivotally mounted to the base frame 1 so that it may be moved from a retracted position toward the rear of the apparatus (see FIGS. 1 and 3), in which it is pointing upward, to a heating position towards the front of the apparatus (see FIG. 2), in which it is pointing forward to face a laminate (see FIG. 6A). The heater support frame 5 includes a counterweight 6 to facilitate this movement.

The height of the heater, when in the heating position, is variable by an adjustable screw stop device 7 (shown only in FIG. 2), and a heat shield 8 (shown only in FIGS. 2 and 3) is hinged from the heater support frame 5, adjacent to and below the heater unit 2, such that when the heater unit 2 is in its heating position, the resilient sheet 3 is protected from the heat of the heater unit.

As shown in FIG. 4, a front edge of the resilient sheet 3 is attached to the base frame 1 by a clamping member 9 which is fixed by screws 10 to an upper steel rail 11 on the base frame 1. Referring back to FIGS. 1 and 3, the rear edge of the sheet 3 is attached along its length to a tensioning bar 12 of a tensioning frame 13.

The tensioning frame 13 has side arms 14 pivoted about an adjustable pivot mounting 15 positioned towards the front of the apparatus, so that it may pivot between a home position (see FIG. 1) in which the resilient sheet 3 is out of contact with a laminate and core, and a forming position, in which it projects forward from the front face of the apparatus and causes the resilient sheet 3 to contact a laminate and form the laminate to a core (see FIGS. 3 and 6A to 6C).

As shown in FIG. 5, each side arm 14 is fitted with a threaded rod 16 along which locknuts 17 run. The tensioning bar 12 is attached to the threaded rods 16 by means of a separate bracket 18 at each of its ends. This allows the position of the tensioning bar 12 to be varied along the side arm lengths to adjust the initial tension in the sheet 3. Further, the bracket 18 may be bolted to any face, e.g. 12a or 12b, of the bar 12 to allow for unlimited adjustment of tension by wrapping the sheet 3 around the bar 12.

Referring to FIG. 1, a pair of support plates 19 (only one shown) face each other and are slidable along the front of the apparatus to engage a core to be laminated. Each plate 19 has a number of metal spikes 20 which grip the core material and hold it in place during the forming operation. The plates 19 slide along a channel 21 which, as shown in FIG.4, is mounted on the upper steel rail 11 of the frame 1. The plates 19 are fitted with screw clamps 22 to secure them in a required position.

Three or more vertical channels 23 are similarly fitted with adjustable brackets 24 to support the base of a core and allow easy positioning of cores when machining several cores of the same dimensions. These vertical channels 23 may be removed when the core shape so requires.

Also mounted on the upper steel frame 11, and on a lower steel frame 25, are timber facings 26 to prevent damage to the core and laminate when mounted on the front of the apparatus.

Referring to FIGS. 6A to 6D, in order to form a laminated section, the core 27 is firstly cut and assembled to a desired section shape and its edges 28 are profiled as required. A postforming grade laminate 29 is then cut to size, and bonded to a flat surface 30 of the core with adhesive, the length of the laminate (in the direction out of the page in FIG. 6A) not exceeding the length of the core, so as to prevent breakage of overhanging laminate ends when machining.

The core and laminate are then placed against the front face 4 of the apparatus and the adjustable brackets 24 of the vertical channels 25 positioned to support the core so that a profiled edge 28 of the core 27 is at a desired height above the base frame 1. For the reasons discussed below, the edge 28 around which the laminate is bent should normally coincide approximately with the pivot axis of the tensioning frame 13. The sliding support plates 19 are then driven against the ends of the core 27, and the screw clamps 22 tightened to hold the core securely in place.

Next, the heater unit 2, having previously been switched on and having attained its working temperature, is pivoted down to the position shown in FIGS. 2 and 6a to heat the region of the laminate 29 which is to conform to the profile of core edge 28. When the laminate 29 has been heated for the required time interval (typically about 50 seconds), the heater unit 2 is returned to its retracted position (shown in FIG. 1) and the tensioning frame 13 of the resilient sheet 3 is moved through the arc shown in FIG. 3, between the positions A, B and C, and, dependent upon the shape of the core, to position D.

As the sheet 3 moves from position A to position B (shown in FIG. 6B), it will be appreciated that its tension increases by an amount dependent upon the height of the pivot axis of the tensioning frame 13 above the level at which the resilient sheet 3 is anchored to the base frame 1. This results from the fact that the anchoring position of the sheet 3 on the rail 11 at the front of the apparatus is approximately aligned with the pivot axis of the frame 13 in the horizontal plane but is spaced below it in the vertical plane whereby the sheet is stretched by an amount roughly corresponding to the vertical spacing as the frame is pivoted from the horizontal to the vertical position.

As the tensioning frame 13 moves from position B to C, the sheet 3 bends the laminate around the core edge profile. FIG. 6C shows the position of the sheet and laminate after having moved through a portion of the arc BC. Further movement from position C to D forms the laminate further around the core profile, as shown in FIG. 6D. To complete and improve the adhesive bond, the laminate is hand-rollered through the resilient sheet. The tensioning frame 13 may then be moved back to its home position and the core removed.

As discussed, the pivot axis of the frame 13 approximately coincides with the edge 28 around which the laminate is bent. The result of this is that in the preferred arrangement the tension in the sheet stays approximately constant, or only slightly increases, during the bending of the laminate (as compared with the greater increase in tension which takes place as the frame 13 is initially moved to its vertical position) and this aids the bending process.

The amount of tension in the resilient sheet 3 during the bending operation can be critical and must be taken into account when setting the height of the tensioning frame pivot axis. In this respect, the distance of the tensioning bar 12 along the side arms 14 may also be varied accordingly.

It has been found that, by using this apparatus, a large number of different core shapes may be laminated, as shown in FIGS. 7 and 8, including profiles having tapered thicknesses and also edge angles of anywhere between 0° to about 200°.

The above embodiment is only one way of putting the present invention into practice, and it will be apparent that many variations on the described embodiment are within the scope of the invention.

I claim:

1. Apparatus for forming a laminate to a core having a profiled edge, the apparatus comprising a core support frame having an open face on which the laminate and core are mounted in use, a movable sheet tensioning frame and a resilient sheet mounted to said tensioning frame, said tensioning frame being movable from a position out of contact with the laminate to a position in which the sheet is in tension and in contact with the laminate, further movement of the tensioning frame over the open face causing the sheet to apply a force to the laminate to form the laminate to the edge of the core.

2. Apparatus according to claim 1, wherein the apparatus includes means for allowing the core edge to project from an edge of the open face in a direction parallel to the face.

3. Apparatus according to claim 2, wherein the open face is substantially vertical, or angled towards the vertical.

4. Apparatus according to claim 1, wherein the resilient sheet is attached at one end to the core support frame and at the other end to the tensioning frame, the tensioning frame being pivotable to move the sheet into and out of contact with the laminate and to urge the laminate around the profiled edge of the core.

5. Apparatus according to claim 4, wherein the pivot axis of the tensioning frame is spaced from the sheet attachment point to the core support frame in such a way that when the tensioning frame is pivoted from a rest position to a position in which it comes into contact with the laminate, the sheet is tensioned by an amount depending upon the distance between the pivot axis and the sheet attachment point.

6. Apparatus according to claim 4, wherein the pivot axis of the frame approximately coincides with the edge of the core around which the laminate is to be formed may be positioned to coincide with the pivot axis of the tensioning frame when the core is mounted to the open face.

7. Apparatus according to claim 4, wherein the sheet attachment point is adjacent the edge of the apparatus from which the core edge extends.

8. Apparatus according to claim 4, wherein the spacing between the sheet attachment point and the pivot axis is variable.

9. Apparatus according to claim 4, wherein the tensioning frame pivot axis is movable.

10. Apparatus according to claim 1, wherein the tensioning frame comprises side arms pivotally mounted to the core support frame, and a tensioning bar between the side arms, to which the resilient sheet is connected and whose position along the side arms may be varied.

11. Apparatus according to claim 1, wherein a pair of sliding support plates are provided on the open face to hold the core adjacent the open face.

12. Apparatus according to claim 1, wherein a number of vertical channels having core supporting means running therealong are provided on the front face of the apparatus.

13. Apparatus according to claim 1, further comprising means for heating the laminate prior to forming.

14. A method of forming a laminate to a core, comprising the steps of bonding the laminate to a surface of the core so that a portion of the laminate overlaps an edge of the core, heating the overlap portion adjacent the core edge to a desired temperature, and bending the overlap around the edge of the core using a resilient sheet which is held in tension by a support frame during the bending process.

15. A kit of parts for attachment to a postforming machine, comprising a resilient sheet for forming a laminate about a core, and a tensioning frame which is pivotally mountable to a machine and adapted to place the sheet in tension and urge it against the laminate during the forming operation.

16. A core which has been laminated by bonding a laminate to a surface of the core by heating areas of the laminate which are to be formed to an edge or edges of the core, and by forming the heated laminate areas about the edge or edges of the core using a resilient sheet which is held in tension during forming.

17. Apparatus for forming a laminate to a core having a profiled edge, the apparatus comprising a core support frame having an open face on which the laminate and core are mounted in use, a resilient sheet mounted in a support frame, and a pair of sliding support plates provided on the open face to hold the core adjacent the open face, the sheet support frame being movable from a position out of contact with the laminate to a position in which the sheet is in tension and in contact with the laminate, further movement of the sheet support frame over the open face causing the sheet to apply a force to the laminate to form the laminate to the edge of the core.

18. Apparatus for forming a laminate to a core having a profiled edge, the apparatus comprising a core support frame having an open face on which the laminate and core are mounted in use, a resilient sheet mounted in a support frame, and a number of vertical channels having core supporting means running therealong provided on the open face, the sheet support frame being movable from a position out of contact with the laminate to a position in which the sheet is in tension and in contact with the laminate, further movement of the sheet support frame over the open face causing the sheet to apply a force to the laminate to form the laminate to the edge of the core.

19. Apparatus for forming a laminate to a core having a profiled edge, the apparatus comprising a core support frame having an open face on which the laminate and core are mounted in use, means for heating the laminate prior to forming, and a resilient sheet mounted in a support frame, the support frame being movable from a position out of contact with the laminate to a position in which the sheet is in tension and in contact with the laminate, further movement of the support frame over the open face causing the sheet to apply a force to the laminate to form the laminate to the edge of the core.

* * * * *

UNITED STATES PATENT AND TRADEMARK OFFICE
CERTIFICATE OF CORRECTION

PATENT NO.   :   5,635,280
DATED        :   June 3, 1997
INVENTOR(S)  :   Richard J. Hyde It is certified that error appears in the above-indentified patent and that said Letters Patent is hereby corrected as shown below:

Column 7, lines 12 and 13, delete "pivot axis of the frame approximately coincides with".

Signed and Sealed this

Tenth Day of March, 1998

BRUCE LEHMAN

*Attest:*

*Attesting Officer*     *Commissioner of Patents and Trademarks*